UNITED STATES PATENT OFFICE.

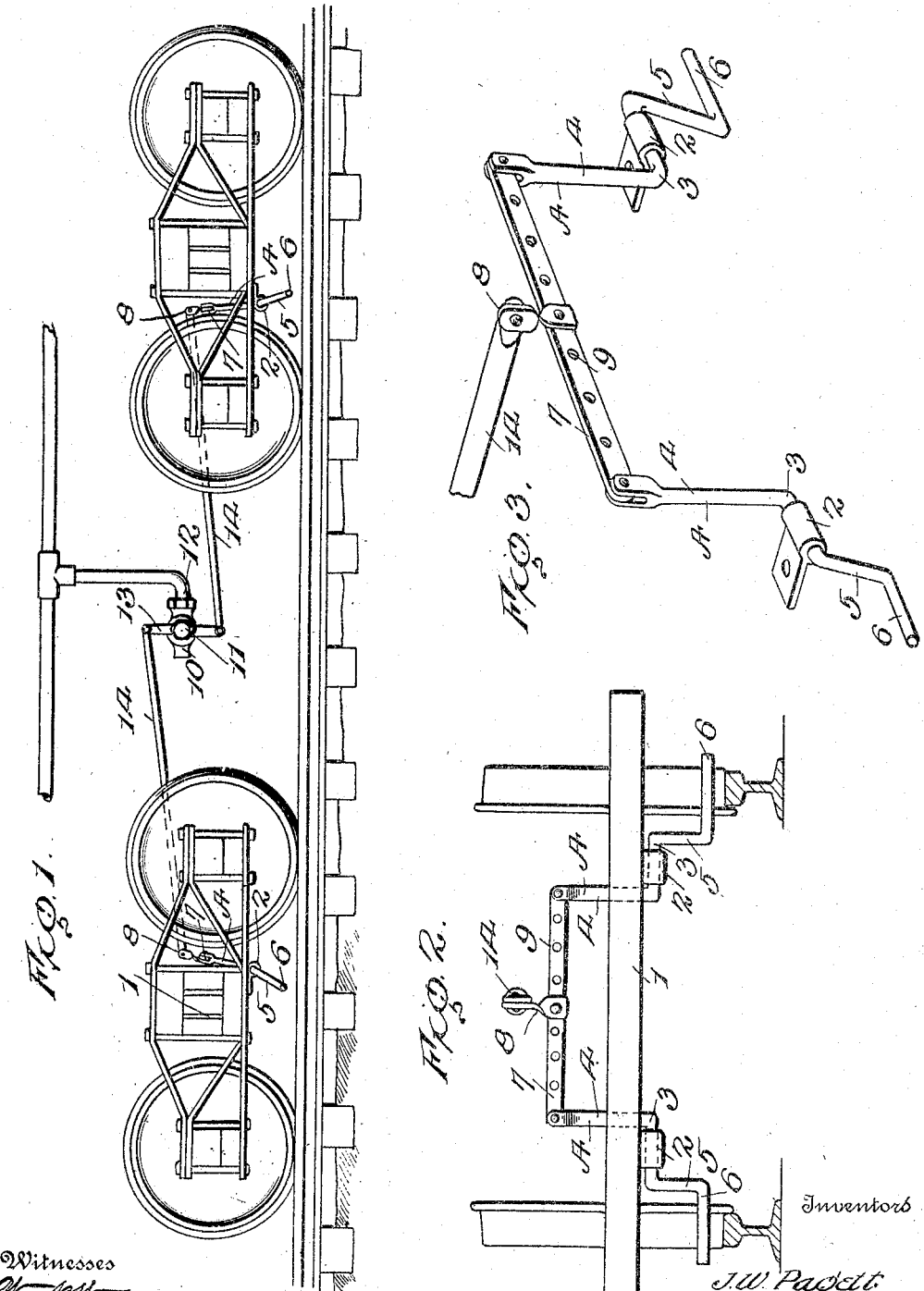

JOHN W. PAGETT AND GEORGE F. PENINGTON, OF CHICKASAWBA, ARKANSAS.

AIR-BRAKE ATTACHMENT.

985,202.  Specification of Letters Patent.  Patented Feb. 28, 1911.

Application filed April 29, 1910. Serial No. 558,350.

*To all whom it may concern:*

Be it known that we, JOHN W. PAGETT and GEORGE F. PENINGTON, citizens of the United States, residing at Chickasawba, in the county of Mississippi and State of Arkansas, have invented certain new and useful Improvements in Air-Brake Attachments, of which the following is a specification.

The object of this invention is an improved air brake attachment designed to automatically exhaust the air from the train pipe of a car should any of the trucks thereof become derailed, the device acting to instantly and automatically effect an emergency application of the brakes throughout all of the cars of the train, and thereby tend to avoid the derailment of the train and the disastrous consequence which will be occasioned thereby.

The invention consists, essentially, in the provision of a valve which is secured to the train pipe of a car and which is designed for automatic actuation by one or more arms carried by the trucks and arranged for engagement by the rails should a truck become derailed. And the invention also consists in certain constructions, arrangements and combinations of the parts that we shall hereinafter fully describe and claim.

For a full understanding of the invention, reference is to be had to the following description and accompanying drawings, in which:

Figure 1 is a side elevation of a portion of a car illustrating our improved air brake attachment applied thereto; Fig. 2 is a transverse sectional view thereof; and, Fig. 3 is a detail perspective view of one pair of tripping arms and their related parts.

Corresponding and like parts are referred to in the following description and indicated in all the views of the drawings by the same reference characters.

In carrying out our invention we secure to the trucks of a car, say to the beam 1 of the truck, hangers 2 of any desired construction and journaled trip arms A in said hangers. In the present embodiment of the invention two of these trip arms are carried by each truck and they embody intermediate horizontally extending journal portions 3, upwardly extending end portions 4 and downwardly extending opposite end portions 5, the extremities of which are turned outwardly, as indicated at 6, so as to assume, in normal position, a slightly elevated relation to the tread surface of the subjacent rails, as clearly illustrated in Fig. 2. The upwardly extending ends 4 of the arms A are pivotally connected to the ends of a cross bar 7, and a stem 8 is adjustably connected to the cross bar 7 so that it may be shifted laterally and be positioned in line with the exhaust valve in the train pipe. In the present instance, to secure this lateral adjustment of the stem 8, the cross bar 7 is formed with a plurality of apertures 9, any one of which is designed to receive a pin or key extending through the stem.

10 designates the emergency exhaust valve. This valve is a two-way valve, that is, it may be opened by a movement of its valve stem 11 in either direction and the casing of the valve preferably embodies a nipple 12 by which it is designed for attachment to a T-joint connected to the train pipe and replacing the ordinary elbow which has heretofore been used. To the stem 11 of the valve a two-way handle 13 is connected, and the opposite ends of this handle are pivotally connected to link rods 14 that are preferably in the form of tubes or pipes so as to combine strength with lightness. These link rods 14 extend in opposite directions and are secured at their outer ends to the stems 8 of the different trucks.

From the foregoing description in connection with the accompanying drawing, the operation of our improved emergency exhaust valve and actuating mechanism therefor will be apparent. So long as the wheels remain properly upon the track rails, the outwardly and laterally extending extremities 6 of the actuating arms A will be held in slightly elevated relation to the tread surface of the rails and the exhaust valve 10 will be closed, the train pipe being thus in no wise interfered with for the usual service and emergency applications of the brakes. In the event that any one of the trucks is derailed, it is obvious that one of the trip arms A will be brought into engagement with the tread surface of the rail and the arm will be rocked in one direction or the other according to the direction of travel, but in any event the trip arm will be moved so that it in turn will turn the stem 11 of the valve 10 and open the latter so as to vent the train pipe and secure an emergency application of the brakes, thereby automatically bringing the entire train to a standstill within the shortest possible time.

It will be noted that the application of our invention will not interfere with the ordinary action of the brake system, that it is composed of comparatively few parts that may be cheaply manufactured and readily assembled and not liable to get out of order and that the device may be secured in position without any material changes in the truck construction or in the train pipe construction.

It is to be understood that the exhaust valve 10 may be secured to any portion of the car framework or foundation. For instance, it may be secured to the cross-over.

Having thus described the invention, what is claimed as new is:

1. In an air brake system, the combination with a train pipe, of an exhaust valve connected thereto, trip arms supported by a truck and embodying upwardly extending portions and downwardly extending portions, the downwardly extending portions being formed with lateral extremities adapted to extend over the track rails normally in elevated relation thereto, a cross bar pivotally connected to the upwardly extending ends of the trip arms, a stem connected to said cross bar, and a link rod operatively connecting said stem with the exhaust valve.

2. In an air brake system, the combination with a train pipe, of an exhaust valve connected thereto, trip arms supported by a truck and embodying upwardly extending portions and downwardly extending portions, the downwardly extending portions being formed with lateral extremities adapted to extend over the track rails normally in elevated relation thereto, a cross bar pivotally connected to the upper ends of the trip arms, a stem having a laterally adjustable connection with said cross bar, and a link rod operatively connecting said stem with the exhaust valve.

3. In an air brake system, the combination with a train pipe of a car, and the trucks of the car, of an exhaust valve connected to the train pipe, a pair of trip arms supported by each truck and including upwardly extending ends and downwardly extending ends, the latter being formed with lateral extremities adapted to project over and above the tread surface of the track rails, cross bars pivotally connecting the upper ends of the respective pairs of arms, stems connected to said cross bars, and link rods operatively connecting said stems to the exhaust valve.

In testimony whereof, we affix our signatures in presence of two witnesses.

JOHN W. PAGETT. [L. S.]
GEORGE F. PENINGTON. [L. S.]

Witnesses:
RICHARD ENGELKE,
VICTOR VIRGILIE.